Patented Mar. 29, 1932

1,851,475

UNITED STATES PATENT OFFICE

MAX ZIMMERMANN, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS FOR THE MANUFACTURE OF ALUMINIUM FLUORIDE

No Drawing. Application filed December 16, 1929, Serial No. 414,595, and in Germany December 31, 1928.

The present invention relates to the manufacture of anhydrous or hydrated aluminium fluoride and consists in treating dry alumina or solid hydrated alumina with gaseous hydrofluoric acid at temperatures between about 0 and 400° C.

The customary commercial process for the manufacture of aluminium fluoride consists in decomposing hydrated alumina by means of aqueous hydrofluoric acid. By this means there is obtained a hydrated product, the dehydration of which is difficult, since it readily loses hydrofluoric acid which, by attacking the walls of the containing vessel, introduces impurities into the product.

It is also known that aluminium fluoride can be obtained from alumina or hydrated alumina by treatment with gaseous hydrofluoric acid, in which process the temperature must be raised to such a high degree that the aluminium fluoride distils or sublimes. In every case known to me the description of this process of manufacture specifies a temperature equivalent to at least red heat, that means about 900° C.

This process has not found any technical application, since no material available for the containing vessels remains stable to hydrofluoric acid at the necessary temperatures.

In accordance with the present invention the technical manufacture of anhydrous or hydrated aluminium fluoride from dry alumina or a solid hydrate thereof, for example, Al(OH)$_3$, or of mixtures of anhydrous and solid hydrated alumina and gaseous hydrofluoric acid, such as is obtainable by the decomposition of fluorspar with sulfuric acid, can be carried out quickly and completely at a much lower temperature. A product containing more or less water is obtained by the process of this invention by effecting the treatment at room temperature, when a reaction takes place in accordance with the equation $$Al_2O_3 + 6HF = 2AlF_3 + 3H_2O$$

or $$Al(OH)_3 + 3HF = AlF_3 + 3H_2O.$$

Furthermore, in accordance with the invention, when the reaction is caused to proceed at a somewhat higher temperature, but still substantially below red heat, say at about 100° C. or somewhat above, the water content decreases in such a manner, that at 100° C. it amounts to about 6% and at 150° C. to about 3%, while at 200° C. and above the aluminium fluoride is practically anhydrous. Anhydrous or nearly anhydrous products are likewise obtainable by first producing at room temperature a hydrated aluminium fluoride and raising the temperature towards the end of the reaction. The water content obtained at the various temperatures employed is the same as stated above.

According to a still further feature of the invention, instead of gaseous hydrofluoric acid, there can also be employed a mixture of gaseous hydrofluoric acid and gaseous hydrochloric acid, such as is produced, for example, in the process of specification Ser. No. 414,594 filed Dec. 16, 1929. The favourable working temperature is about the same as when using gaseous hydrofluoric acid alone. It is remarkable that, when using a mixture of hydrofluoric acid and hydrochloric acid vapors, only aluminium fluoride is obtained.

The invention is illustrated by the following example without being limited thereto:

*Example.*—A current of gaseous, hydrofluoric acid is passed over solid hydrated alumina at room temperature until clouds of fume emerge from the end of the apparatus. While still passing hydrofluoric acid through the vessel, the temperature is raised to about 200° C. and, as soon as considerable quantities of hydrofluoric acid again escape the reaction is complete.

Alternatively a mixture of hydrofluoric acid and hydrochloric acid vapors is used instead of hydrofluoric acid alone, the conditions of working otherwise being as specified above. In this case also the mixed acids are passed through until substantial quantities of hydrofluoric acid vapor emerge from the end of the apparatus. In this manner aluminium fluoride is obtained, the hydrofluoric acid content of which fulfills or exceeds the customary commercial requirements.

(HF = 56%.)

I claim:

1. Process for preparing aluminium fluoride comprising treating a compound of the group consisting of anhydrous alumina and solid hydrated alumina and mixtures thereof with gaseous hydrofluoric acid at temperatures of between about 0 and 400° C.

2. Process for preparing aluminium fluoride comprising treating a compound of the group consisting of anhydrous alumina, solid hydrated alumina and mixtures of anhydrous and solid hydrated alumina with gaseous hydrofluoric acid at first at a temperature of about 15° C. until the mass is saturated with hydrofluoric acid, then raising the temperature to about 200° C. and continuing the introduction of gaseous hydrofluoric acid until the decomposition is complete.

In testimony whereof, I affix my signature.

MAX ZIMMERMANN.